United States Patent [19]

Ramcke

[11] Patent Number: 4,502,592
[45] Date of Patent: Mar. 5, 1985

[54] APPARATUS FOR INTERMITTENTLY TRANSPORTING STACKS OF PAPER SHEETS OR THE LIKE

[75] Inventor: Bernd Ramcke, Hamburg, Fed. Rep. of Germany

[73] Assignee: E.C.H. Will (GmbH & Co.), Hamburg, Fed. Rep. of Germany

[21] Appl. No.: 417,662

[22] Filed: Sep. 13, 1982

[30] Foreign Application Priority Data

Feb. 13, 1982 [DE] Fed. Rep. of Germany ....... 3205157

[51] Int. Cl.$^3$ ............................................. B65G 15/14
[52] U.S. Cl. .................................................. 198/627
[58] Field of Search ............... 198/461, 577, 579, 627, 198/653, 654, 726

[56] References Cited

U.S. PATENT DOCUMENTS 1,787,254 12/1930 Kirman et al. ....................... 198/461
3,325,977 6/1967 Kirsten ................................ 198/653
4,398,629 8/1983 Williamson .......................... 198/627

FOREIGN PATENT DOCUMENTS 2456908 8/1976 Fed. Rep. of Germany .
2092982 8/1982 United Kingdom ................ 198/627

*Primary Examiner*—Joseph E. Valenza
*Attorney, Agent, or Firm*—Peter K. Kontler

[57] ABSTRACT

An apparatus for transporting several files of spaced-apart stacks of paper sheets has several transporting units, one for each file of stacks, and each such transporting unit has three endless toothed belts which are installed in a frame in parallel vertical planes and carry outwardly extending lobes. The lobes on the two outer belts of a unit engage the rear edge faces and the lobes on the median belt of each unit engage the front edge faces of stacks in the respective files. Each belt is trained over two toothed pulleys and one pulley of each outer belt is driven by a first shaft whereas one pulley of each centrally located belt is driven by a second shaft. The second shaft is driven directly by a stepping motor, and the first shaft is driven by the stepping motor through the medium of a transmission which alternately increases and reduces the speed of the first shaft relative to the second shaft so that the lobes on the outer belts of each unit move away from the lobes of the centrally located belts, while the respective transporting units are in the process of receiving fresh stacks or discharging stacks, to thus ensure that the lobes cannot deface or otherwise damage the sheets of the stacks and that the stacks can be properly transferred onto the respective transporting units even if they are not delivered thereto at regular intervals.

19 Claims, 4 Drawing Figures

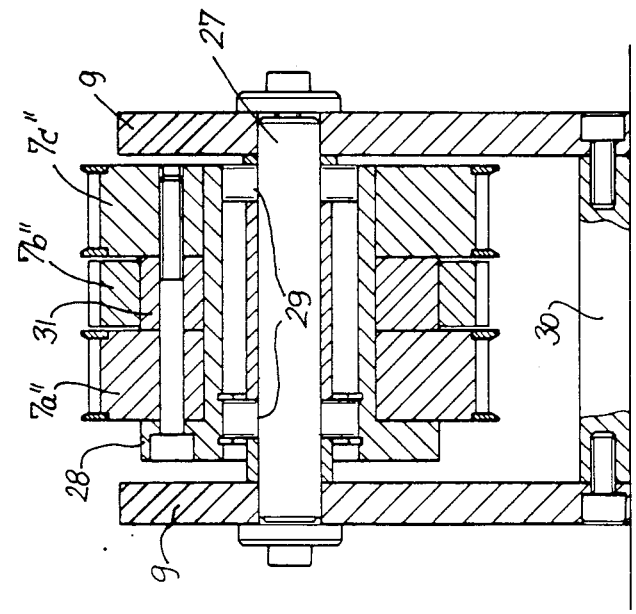
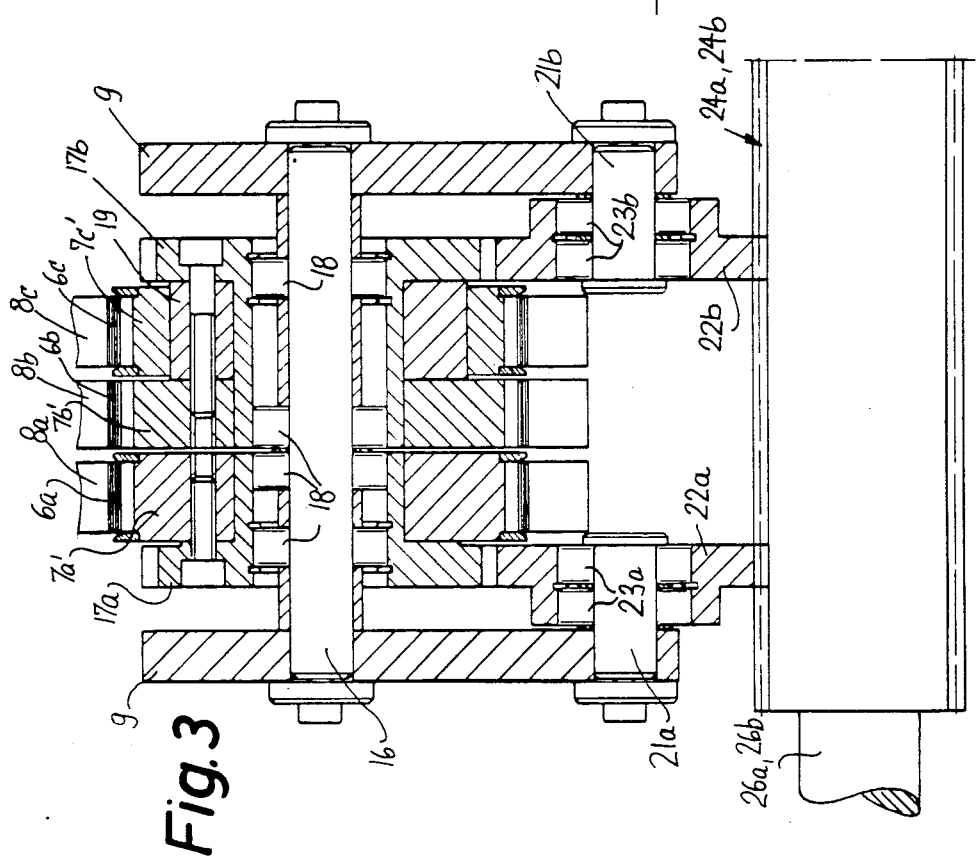

APPARATUS FOR INTERMITTENTLY TRANSPORTING STACKS OF PAPER SHEETS OR THE LIKE

CROSS-REFERENCE TO RELATED CASE

The apparatus of the present invention is somewhat similar to the apparatus which is disclosed in the commonly owned copending patent application Ser. No. 343,742 filed Jan. 29, 1982 by Dieter Ladewig and Bernd Ramcke for "Apparatus for intermittently transporting stacks of paper sheets or the like".

The drawing and the description of the drawing in the present application are identical with those in the commonly owned copending patent application Ser. No. 420,855 filed Sept. 21, 1982 by Bernd Ramcke and Günther Stahl for "Apparatus for transporting paper stacks or the like".

BACKGROUND OF THE INVENTION

The invention relates to improvements in apparatus for transporting discrete commodities, particularly for transporting stacks consisting of paper sheets or the like. More particularly, the invention relates to improvements in apparatus for intermittent transport of one or more files of spaced-apart stacks or piles of superimposed sheets or the like. Still more particularly, the invention relates to improvements in apparatus of the type wherein each file of stacks is transported by several endless conveyors in the form of belts, e.g., by three endless belts which are disposed in parallel vertical planes and are provided with entraining elements in the form of projections or lobes serving to advance as well as to locate the stacks during transport along a predetermined path.

The aforementioned commonly owned copending application Ser. No. 343,742 discloses a transporting apparatus wherein three transporting units are disposed side by side, and each such unit comprises three belts including a centrally located belt whose projections engage the front edge faces of the stacks and two outer belts whose projections engage the rear edge faces of the stacks on or above the respective transporting unit. The belts are trained around pairs of pulleys, and the drive means for the belts comprises a first shaft which transmits torque to the pulleys for the outer belts in each transporting unit and a second shaft which transmits torque to the pulleys for the centrally located belt in each unit. The two shafts receive motion from a common stepping motor.

The apparatus of the aforementioned commonly owned copending application Ser. No. 343,742 operates quite satisfactorily as soon as a stack of paper sheets is properly located between a (leading) projection of the centrally located belt and the (trailing) projections of the outer belts forming part of a transporting unit. However, problems can arise in connection with the delivery of stacks onto the transporting units because the distance between the projections of the centrally located belt and the projections of the outer belts in each transporting unit is fixed. Therefore, it is necessary to urge the leading edge face of a freshly delivered stack against a projection of the centrally located belt while the corresponding projections of the outer belts advance from a lower level to a higher level in order to engage the trailing edge face of such freshly delivered stack. Similar problems can be encountered during removal of stacks from the path which is defined by the transporting apparatus, e.g., from the upper surface of a platform which is installed at a level above the upper reaches of the belts in each of the transporting units. As a rule, it is necessary to accelerate the stacks once the leading projections (on the respective centrally located belts) descend below the associated platforms in order to make sure that the corresponding trailing projections will have room to descend to a level below the platform during movement around the pulleys at the downstream ends of the respective transporting units. If the aforedescribed precautionary measures are not fulfilled, e.g., if the leading edge face of a stack is not urged against the projection of the centrally located belt in the respective transporting unit, the oncoming projections of the outer belts are likely to lift the rear portion of the stack with attendant shifting of sheets in the stack relative to one another. Furthermore, the rising trailing projections which are to engage the trailing edge face of a freshly delivered stack are likely to score or to otherwise deface the sheets of the stack. The trailing projections are also likely to shift the sheets of a stack at the discharge end of the respective transporting unit if the stack is not accelerated before the projections which engage its trailing edge face during transport toward the discharge end of the transporting unit begin to descend to a level below the platform without contacting the trailing edge face of the stack.

OBJECTS AND SUMMARY OF THE INVENTION

An object of the invention is to provide a novel and improved apparatus which can transport stacks of paper sheets or the like without any shifting of the sheets and/or without any damage to the leading or trailing edge faces of such commodities.

Another object of the invention is to provide a transporting apparatus which can properly engage and/or release the stacks even if the stacks are not supplied thereto at identical or nearly identical intervals.

A further object of the invention is to provide a transporting apparatus which can be installed in many production lines for stationery products as a superior substitute for heretofore known transporting apparatus.

An additional object of the invention is to provide the apparatus with novel and improved means for converting its transporting unit or units for advancement of shorter or longer stacks.

A further object of the invention is to provide a transporting apparatus wherein the projections of conveyors in the transporting unit or units provide ample room for convenient admission of successive stacks but are nevertheless capable of accurately spacing successively delivered stacks from one another not later than when the stacks are about to leave the apparatus.

An additional object of the invention is to provide a novel and improved method of intermittently transporting one or more files of stacked paper sheets or the like along a predetermined path at any desired intervals and without any shifting of sheets in a stack and/or scoring or otherwise defacing the edge faces of the transported stacks.

Another object of the invention is to provide the apparatus with novel and improved means for varying the spacing between the projections of conveyors in its transporting unit or units.

A further object of the invention is to provide novel and improved means for driving the conveyors of the transporting unit or units in an apparatus of the above outlined character.

The invention is embodied in an apparatus for stepwise transport of at least one file of discrete commodities, particularly for transporting stacks consisting of overlapping paper sheets or the like in a predetermined direction and along a predetermined path. The apparatus comprises at least one transporting unit including more than two endless parallel conveyors each having at least one projection arranged to extend into and from the path in response to movement of the respective conveyor in the predetermined direction. The conveyors of each transporting unit include a first group or set having at least one conveyor whose projection is located ahead of, and a second group or set having at least one conveyor whose projection is located behind a commodity in the path, as considered in the predetermined direction. Each transporting unit further includes discrete first and second rotary elements (e.g., toothed pulleys if the conveyors are endless toothed belts) for each of the conveyors, and each conveyor is trained over the respective rotary elements. The apparatus further comprises drive means for the conveyors of each transporting unit, and such drive means includes a first shaft which serves to drive one rotary element for each conveyor of the first group, a second shaft serving to drive one rotary element for each conveyor of the second group, stepping motor means which is common to and serves to intermittently rotate the two shafts, and transmission means which is interposed between the stepping motor means and one of the shafts and includes means for intermittently changing the angular position of the one shaft with reference to the other shaft to thereby change the spacing between the projection of each conveyor in one of the groups and the projection of each conveyor in the other group.

One of the groups can include two spaced parallel conveyors in the form of toothed belts, chains or the like, and the other group can comprise a single conveyor disposed between the conveyors of the aforementioned pair.

The one shaft is preferably arranged to drive one rotary element for each conveyor of the second group, namely, of the group whose projection or projections engage the trailing portion of a commodity in the path.

The means for intermittently changing the angular position of the one shaft with reference to the other shaft can comprise means for accelerating the one shaft with reference to the other shaft, means for decelerating the one shaft with reference to the other shaft, or means for alternatively accelerating and decelerating the one shaft with reference to the other shaft. The transmission means can be constructed, assembled and operated to change the angular position of the one shaft with reference to the other shaft during the intervals of idleness of the stepping motor means between successive rotations of the shafts.

The stepping motor means and the transmission means can be driven by a common prime mover, e.g., by a variable-speed electric motor which drives the moving parts of an entire production line wherein the transporting apparatus of the present invention is used to advance one or more files of stacked paper sheets between two successive treating stations.

The transmission means can further comprise an endless flexible element (such as an endless toothed belt or a chain) which is trained over the shafts and has first and second reaches or stretches. In such apparatus, the means for changing the angular position of the one shaft with reference to the other shaft can comprise a first dancer roll or analogous loop forming means which engages one of the reaches, a second dancer roll or analogous loop forming means which engages the other reach, and means for simultaneously shifting the two dancer rolls relative to the flexible element so that the dimensions of the loop which is formed by one of the dancer rolls in the respective reach of the flexible element increase proportionally with attendant reduction of the dimensions of the loop which is formed by the other dancer roll in the respective reach of the flexible element or vice versa and the one shaft is rotated by the flexible element relative to the other shaft when the dimensions of the loops change. The shafts preferably comprise pulleys or sprocket wheels over which the flexible element is trained.

The shifting means can include common holder means for the dancer rolls, and the transmission means can further include guide members flanking one of the loop-forming dancer rolls. The flexible element is then trained over such guide members which are preferably idler rolls or pulleys rotatable about fixed axes. The shifting means can further comprise a pivotable lever for the common holder means and a cam-and-follower assembly for pivoting the lever back and forth.

The drive means of the transporting apparatus can further comprise an endless toothed belt or other suitable means for transmitting torque from the stepping motor means directly to the other shaft. The means for intermittently changing the angular position of the one shaft relative to the other shaft then preferably comprises means (such as the aforementioned endless flexible element) for rotating the one shaft in response to rotation of the other shaft.

The transmission means of the drive means can further comprise means for changing the angular position of the other shaft with reference to the one shaft.

Still further, the apparatus can comprise means for changing the angular position of one of the shafts with reference to the other shaft independently of the transmission means, i.e., for changing the angular position of one of the shafts relative to the stepping motor means as well as relative to the transmission means.

If the conveyors of one or more transporting units are endless toothed belts, the projections may constitute lobes which are integral with or fixedly secured to the respective belts.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged composite transverse sectional view as seen in the direction of arrows from the lines III—III and III-III' of FIG. 2, with the two sectional views shown in a common plane; and FIG. 4 is an enlarged transverse sectional view as seen in the direction of arrows from the line IV—IV of FIG. 2.

DESCRIPTION OF THE PREFERRED EMBODIMENTS

Figure 1:
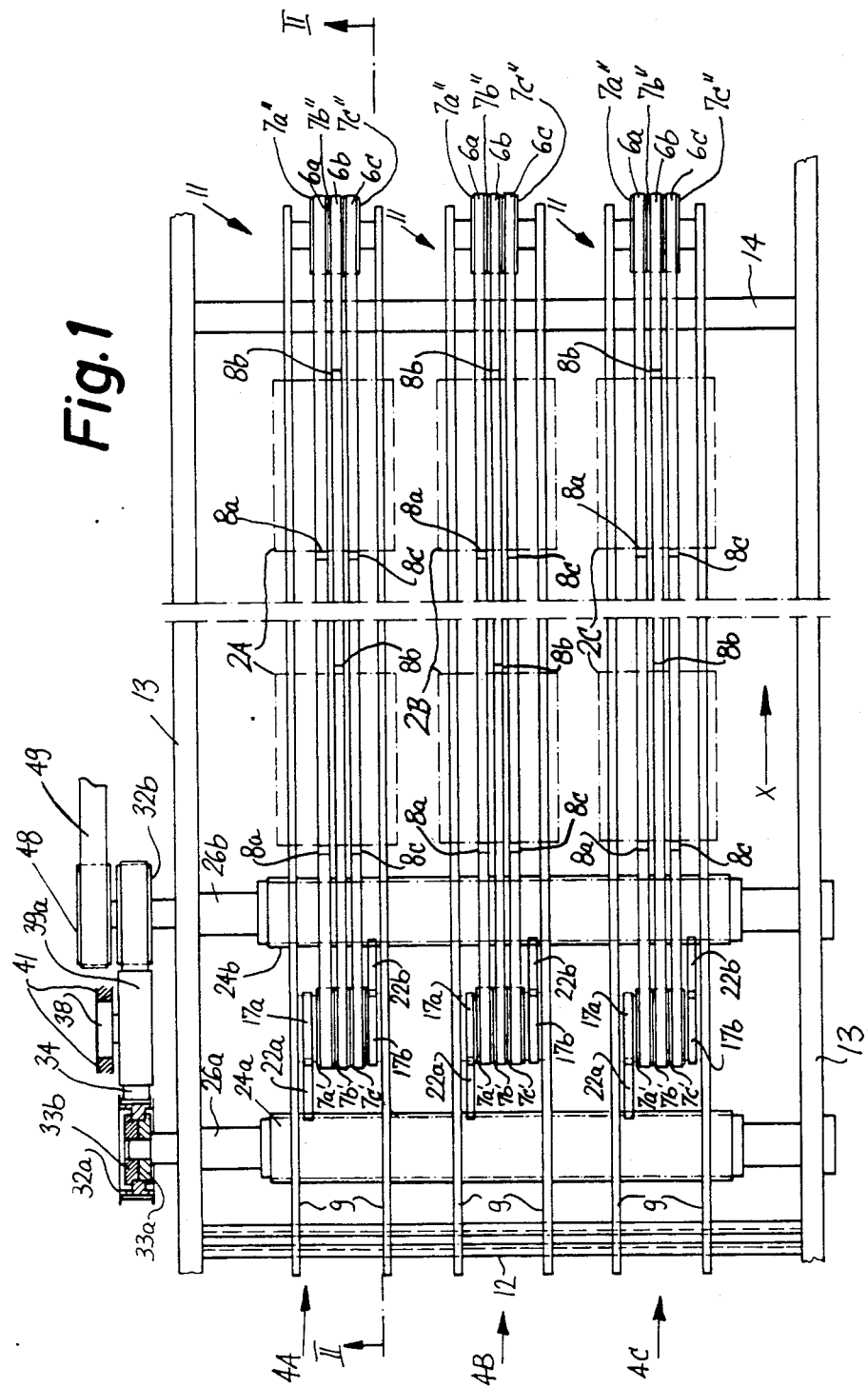
FIG. 1 is a schematic plan view of a transporting apparatus with three transporting units which embodies the present invention.

Referring first to FIG. 1, there is shown a sheet transporting apparatus 1 for files of paper stacks wherein each file comprises a succession of stacks 2A, 2B or 2C. The neighboring stacks 2A, 2B, 2C form rows extending transversely of the direction of forward movement (note the arrow X) of such rows. The horizontal or nearly horizontal path along which the rows of stacks 2A to 2C are advanced stepwise in the direction of arrow X is defined by one or more sheet metal platforms or tables 3 one of which is shown in the upper part of FIG. 2.

The apparatus 1 comprises three transporting units 4A, 4B and 4C which respectively serve for stepwise transport of the files of stacks 2A, 2B and 2C along the upper sides of the corresponding platforms 3. The transporting units 4A to 4C are installed at a level below the preferably horizontal platforms 3. Each of the transporting units 4A to 4C comprises three endless flexible sheet-advancing conveyors in the form of toothed belts 6a, 6b, 6c which are disposed in parallel vertical planes and are respectively trained about rotary elements in the form of toothed pulleys, 7a'-7a", 7b'-7b" and 7c'-7c". The belts 6a, 6b, 6c are respectively provided with entraining means in the form of projections or lobes 8a, 8b and 8c which are rigidly secured to the respective belts. The length of the projections 8a, 8b and 8c is such that they can extend upwardly between and beyond the upper sides of the platforms 3 and into the path of movement of stacks 2A, 2B, 2C to such an extent that they can engage the respective (front or rear) edge faces of the stacks 2A, 2B, 2C all the way between the undersides and the upper side thereof. As can be seen in the upper portion of FIG. 2, the projections 8b and 8c which travel with the horizontal upper reaches of the respective belts 6b, 6c extend upwardly and beyond the upper sides of the respective stacks 2A.

The toothed pulleys 7a' to 7c" of the transporting units 4A, 4B and 4C are installed in discrete frames 11 each of which comprises two spaced parallel sidewalls or cheeks 9 (see also FIG. 3) extending in parallelism with the direction indicated by the arrow X. The frames 11 are omitted in FIG. 2 for the sake of clarity. Such frames are installed in a guide 12 of a housing 13 and rest on a crosshead 14 of the housing 13.

Suitable clamping means (not specifically shown) separably secure the frames 11 to the guide 12; when the clamping means are loosened or removed, the frames 11 can be shifted in the longitudinal direction of the guide 12, i.e., transversely of the direction indicated by the arrow X, to thus convert the transporting units 4A, 4B and 4C for the handling of stacks having different widths. If desired or necessary, one or more additional transporting units can be installed in the housing 13, or one or two transporting units (e.g., the units 4B and 4C) can be removed from such housing. This depends on the desired number of stacks in each transversely extending row, i.e., each such row can consist of a single stack or of two or more stacks, depending on the nature of the treating station which follows the improved transporting apparatus.

The transporting units 4A, 4B and 4C are preferably identical or of similar design. The details of one such transporting unit are shown in FIGS. 3 and 4. As can be seen in FIG. 3, the cheeks 9 of a frame 11 are connected to each other by a transversely extending shaft 16 which carries annular gears 17a and 17b mounted on antifriction bearings 18 so that the gears can rotate on the shaft 16. The gear 17a is coaxially secured to the toothed pulley 7a' by screws or other suitable fasteners, and the gear 17b is secured to the toothed pulley 7b' as well as to an intermediate ring 19. The pulley 7c' is rotatably mounted on the intermediate ring 19. The cheeks 9 carry bolts 21a, 21b which constitute shafts rotatably supporting gears 22a, 22b which respectively mesh with the gears 17a, 17b and are respectively rotatable on antifriction bearings 23a, 23b. The gears 22a and 22b are further respectively in mesh with elongated driver gears 24a and 24b which are common to the transporting units 4A to 4C and are respectively mounted on shafts 26a, 26b.

FIG. 4 shows that the cheeks 9 of a frame 11 are further connected to one another by an additional shaft 27 surrounded by a sleeve 28 which rotates on a pair of antifriction bearings 29. The sleeve 28 is surrounded by and rotates with the toothed pulleys 7a" and 7c". Furthermore, the sleeve 28 is surrounded by an intermediate ring 31 which is disposed between the pulleys 7a", 7c" and carries the toothed pulley 7b" so that the latter is free to rotate with reference to the pulleys 7a" and 7c". For example, the ring 31 can be rigid with the sleeve 28, and the pulley 7b" can rotate about the ring 31.

FIG. 4 further shows that the cheeks 9 of the frame 11 are connected to each other by one or more reinforcing and stiffening elements in the form of braces 30 to thus ensure that the respective frame 11 can stand pronounced deforming stresses.

The belts 6a, 6c flank the belt 6b of the respective transporting unit, the projections 8b of the belt 6b normally engage the front edge faces, and the projections 8a, 8c normally engage the rear edge faces of the stacks 2A, 2B or 2C on the platform 3 above the respective transporting unit.

The shaft 26a and its elongated gear 24a drive the gear 22a which, in turn, drives the gear 17a and the pulley 7a'. The latter drives the toothed belt 6a which drives the pulley 7a" and the pulley 7c" (the pulleys 7a" and 7c" are connected to each other by the sleeve 28 to rotate as a unit). The pulley 7c" drives the toothed belt 6c.

The shaft 26b and its elongated gear 24b drive the gears 22b and 17b to thus rotate the toothed pulley 7b' which, in turn, drives the toothed belt 6b.

The shafts 26a and 26b respectively carry toothed pulleys 32a and 32b. The pulley 32a is not directly secured to the shaft 26a but rather by two clamping discs 33a, 33b (see FIG. 1) which are held together by removable screws or analogous fasteners in a manner as described and shown in the aforementioned copending application Ser. No. 343,742. The clamping discs 33a, 33b are non-rotatably secured to the shaft 26a. An endless flexible element 34, here shown as a toothed belt, is trained over the pulleys 32a, 32b to normally transmit torque between the shafts 26a, 26b. When the clamping discs 33a, 33b are disengaged from the pulley 32a, the angular position of the shaft 26a with reference to the shaft 26b can be changed and/or vice versa. This changes the positions of toothed belts 6a, 6b with reference to the toothed belt 6b in each of the transporting units 4A, 4B and 4C. In other words, the positions of projections 8a and 8c are then changed with reference to the projections 8b. When the screws for the clamping discs 33a, 33b are reapplied, the conversion of the apparatus for stepwise transport of differently dimensioned (longer or shorter) stacks 2A, 2B, 2C is completed.

The toothed belt 34 forms part of a variable transmission 36 which renders it possible to drive the shafts 26a, 26b periodically at different speeds, namely, the shaft 26a at a first rotational speed and the shaft 26b at a different second rotational speed. The transmission 36 further comprises two guide members here shown as toothed pulleys 37a, 37b which are respectively mounted on stationary shafts 137a, 137b and constitute idler pulleys. Still further, the transmission 36 comprises two loop forming pulleys 39a, 39b which are rotatably mounted on a common holder 38 forming part of a shifting means for the pulleys 37a, 37b. As shown in the lower left-hand portion of FIG. 2, the belt 34 is trained over the pulleys 24a, 24b, over the pulleys 37a, 37b and over the pulleys 39a, 39b in such a way that it forms a first loop 34a in its reach extending between the pulleys 24a, 24b (the pulley 39a can be said to constitute a dancer roll which is located in the bight of the loop 34a) and a second loop 34b in its reach extending between the pulleys 37a, 37b (the pulley 39b can be said to constitute a dancer roll in the bight of the loop 34b). The holder 38 for the pulleys or dancer rolls 39a, 39b is movable up and down by a link 41 which is attached to the free end of a one-armed lever 46 fulcrumed at 44 and carrying a roller follower 43 tracking a rotary disc cam 42. The parts 38, 41, 42, 43, 44, 46 together constitute an adjusting means 40 for the pulleys 39a, 39b, namely, a means for changing the lengths of the loops 34a and 34b and for thereby changing the angular position of the shaft 26a with reference to the shaft 26b. The cam 42 receives torque from the main prime mover 152 of the production line which embodies the apparatus of the present invention, e.g., a production line for the making of steno pads or other types of stationery products.

It is clear that some or all of the various belts and pulleys which are shown in the drawing can be respectively replaced by chains and sprocket wheels without departing from the spirit of the invention.

If the holder 38 with the pulleys 39a, 39b is moved upwardly against the opposition of a spring or the like (not shown) which biases the roller follower 43 on the intermediate portion of the lever 46 against the periphery of the cam 42, the length of the loop 34a is reduced and the length of the loop 34b is increased accordingly. If the pulley 32b is held against rotation, such upward movement of the holder 38 entails a rotation of the pulley 32a in a counterclockwise direction, as viewed in FIG. 2. In other words, the belts 6a and 6c move rearwardly (counter to the direction which is indicated by the arrow X) so that the distance between the projections 8a and 8c on the one hand (these projections engage the trailing edge faces of the stacks 2A to 2C) and the projections 8b on the other hand (the projections 8b engage the leading edge faces of the stacks 2A to 2C) increases. In other words, the projections 8a, 8c and 8b provide more room for insertion of paper stacks therebetween.

Figure 2:
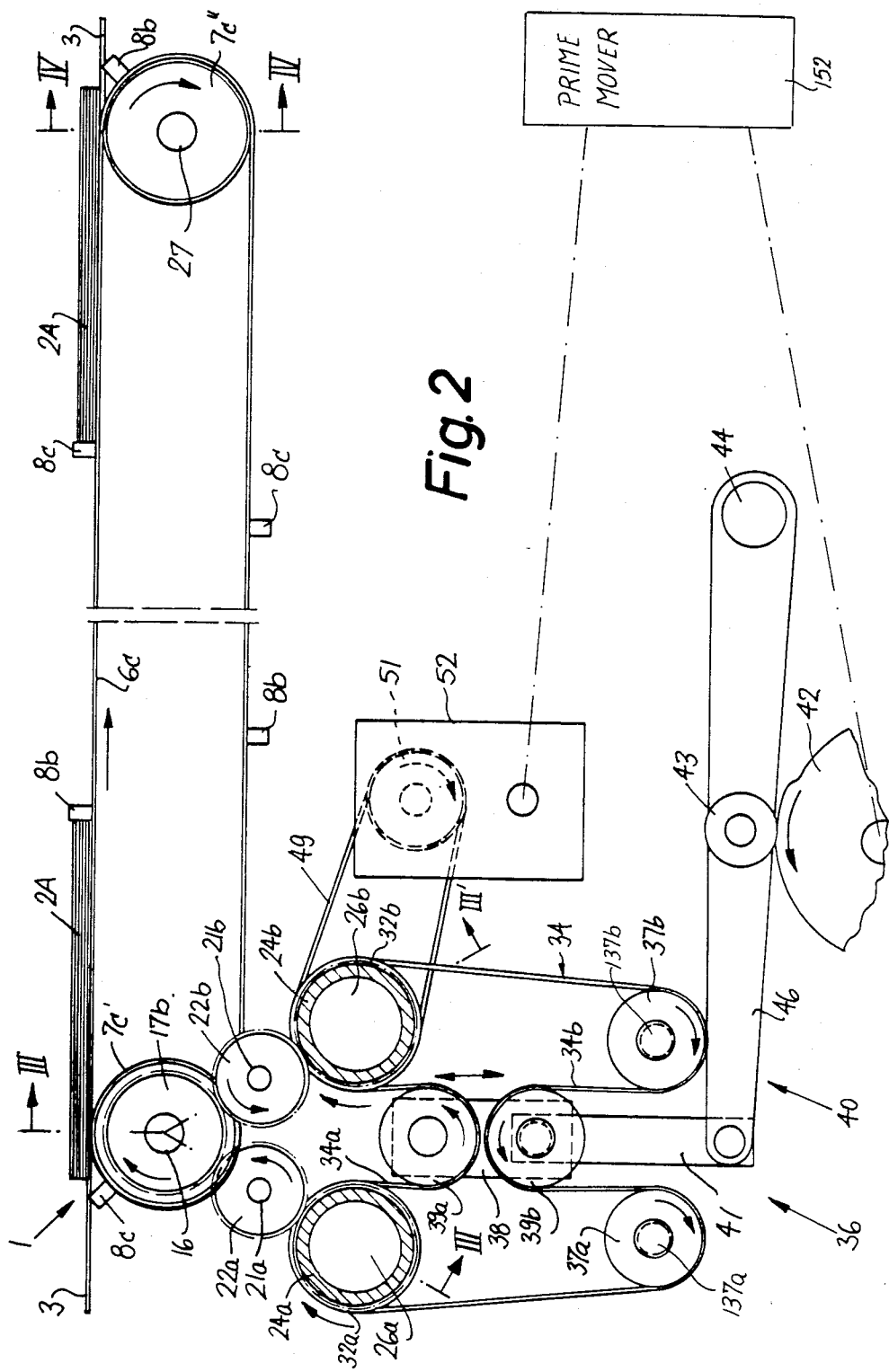
FIG. 2 is an enlarged longitudinal vertical sectional view of the apparatus as seen in the direction of arrows from the line II—II of FIG. 1, showing the stepping motor means and the transmission means for driving the conveyors of one of the transporting units.

If the pulley 32b is driven in a clockwise direction, as viewed in FIG. 2, the belts 6a and 6c do not perform any movement counter to the direction of arrow X while the distance between the roller follower 43 and the axis of the cam 42 remains unchanged. All that happens is that the belts 6a, 6c of each transporting unit (4A, 4B, 4C) lag behind the corresponding median belts 6b.

If the holder 38 is moved downwardly (i.e., if the aforementioned spring moves the roller follower 43 nearer to the axis of rotation of the cam 42), the length of the loop 34a is increased and the length of the loop 34b decreases accordingly. Therefore, the projections 8a, 8c of the belts 6a, 6c move nearer to the respective projections 8b.

The shaft 26b carries a further toothed pulley 48 (FIG. 1) for a toothed belt 49 which is further trained over the toothed pulley 51 on the output shaft of a stepping motor or transmission 52 receiving motion from the main prime mover 152 of the production line.

The operation of the stepping motor 52 is synchronized with the operation of the transmission 36 (by appropriate configuration of the cam 42) in such a way that, in the positions of parts which are shown in FIG. 2 (i.e., during transfer of a row of paper stacks 2A to 2C onto the transporting units 4A to 4C), the distance between each leading or front projection 8b and the respective rear or trailing projections 8a, 8c exceeds the length of a stack 2A, 2B or 2C (as considered in the direction of arrow X). This facilitates and simplifies the delivery of rows of commodities 2A to 2C into the range of the respective transporting units 4A to 4C. The advantage of such mode of operation will be readily appreciated since the movements of the oncoming rows of commodities 2A to 2C need not exactly conform to varying speeds of the belts 6a to 6c in the respective transporting units 4A to 4C. The varying speeds of the belts 6a to 6c in each of the transporting units 4A to 4C are attributable to the provision of the stepping motor 52 in addition to the provision of the transmission 36.

After the projections 8a and 8c begin to move about the shaft 16 and upwardly through the slots between the platforms 3 of the transporting apparatus 1, these projections begin to move nearer to the respective front projections 8b so that each commodity (2A, 2B, 2C) of a freshly admitted row of commodities assumes a predetermined position with reference to the previously advanced row of commodities. In other words, the front edge faces of freshly admitted commodities 2A to 2C are caused to move against the respective front projections 8b while the rear edge faces of such commodities are engaged by the corresponding pairs of projections 8a and 8c.

The configuration of the peripheral face of the cam 42 is such that, when a row of commodities 2A to 2C moves close to the front or discharge end of the apparatus 1, namely, close to the front pulleys 7a", 7b", 7c", the transmission 36 and the motor 52 cooperate to reduce the speed of the pairs of trailing projections 8a, 8c with reference to the respective front projections 8b to thus allow for more convenient removal of the foremost row of commodities 2A to 2C from the apparatus, e.g., by resort to so-called band tongs, without the need for an acceleration of the commodities because the spacing which is provided as a result of deceleration of the projections 8a, 8c with reference to the projections 8b allows for unimpeded descent of the trailing projections 8a, 8c to a level below the platforms 3 when such projections reach the shaft 27 at the discharge end of the apparatus 1. In other words, the projections 8a, 8c are retracted from the trailing edges of the respective commodities in good time before they begin to descend to a level below the plane of the platforms 3.

The aforedescribed movements of projections 8a, 8c with reference to the associated projections 8b do not affect the appearance and/or quality of those commodities 2A to 2C which are not in the process of being delivered to or removed from the apparatus because such relative movements do not affect the placing of each and every row of a long series of rows of commodities into a predetermined position with reference to the preceding row. Thus, there is a stage of transport of each row of commodities when the leading edge faces of such commodities are engaged by the projections 8b while the trailing edge faces of the commodities are engaged by the corresponding projections 8a, 8c to thereby ensure accurate positioning of the row with reference to the immediately preceding row. Relative movements of the projections 8b and 8a, 8c or vice versa can also take place while the stepping motor 52 is idle.

An important advantage of the improved transporting apparatus is that the transporting units 4A, 4B, 4C can properly receive and properly transport successive stacks of the respective files of stacks irrespective of whether or not the stacks are delivered thereto at identical intervals. This is due to the fact that the transmission 36 comprises means 40 for intermittently changing the angular position of the shaft 26a relative to the shaft 26b so that the projections 8b move ahead of the projections 8a, 8c immediately therebehind with the result that a fresh stack 2A, 2B or 2C can be delivered into the range of the respective transporting unit 4A, 4B or 4C even if its spacing from the preceding stack is not normal, i.e., even if such spacing is greater or smaller than the anticipated (normal or average) distance between successive stacks of a file. Consequently, the front edge face of a stack which moves onto a platform 3 can be spaced apart from the respective projection 8b without risking damage to its rear edge face as a result of engagement of such rear edge face by the respective projections 8a and 8c. The projections 8a, 8c emerge from the respective slots in the platforms 3 behind the trailing edge face of the stack and are thereupon accelerated with reference to the associated projections 8b to ensure that the stack is moved toward and against the projection 8b not later than at the time when the projections 8a, 8c are decelerated again to allow for unimpeded transfer of the stack from the respective transporting unit. The projections 8a, 8b and 8c can also perform a highly desirable orienting or aligning function, i.e., they ensure that each freshly delivered stack is properly aligned with the preceding stacks of the same file (on the transporting unit 4A, 4B or 4C) not later than when the stack is ready to leave the corresponding transporting unit. This is due to the fact that the conveyors 6a and 6c (which carry the projections 8a, 8b serving to engage the trailing edge faces of the respective stacks) flank the centrally located conveyors 6b and that the projections 8b of the belts 6b are located midway or substantially midway between the associated projections 8a, 8c, as considered at right angles to the direction of transport of stacks along the platforms 3.

Since the projections 8a, 8c are decelerated relative to the corresponding projections 8b before a stack is advanced beyond the respective transporting unit, such stack need not be accelerated at the time it leaves the apparatus. The movements of projections 8a, 8c toward and away from the associated projections 8b do not affect the orientation of stacks, the positions of sheets in such stacks and/or the appearance of the front or rear edge faces of the stacks because the acceleration of the projections 8a, 8c can be sufficiently gradual to avoid undue stressing of the stacks and/or their sheets during delivery of fresh stacks to the transporting unit. In fact, and as already mentioned above, movements of the projections 8a, 8c relative to the associated projections 8b can be resorted to for effecting proper orientation of each stack prior to advancement of such stack beyond the pulleys 7a'', 7b'', 7c'' of the corresponding transporting unit. Deceleration of projections 8a, 8c relative to the corresponding projections 8b at the discharge ends of the transporting units evidently cannot affect the appearance and/or other characteristics of the stacks.

An advantage of the feature that the transmission 36 can (if desired) change the angular position of the shaft 26a relative to the shaft 26b while the motor 52 is idle between successive rotations of the two shafts is that the stacks 2A, 2B and/or 2C can be shifted sideways while the conveyor belts 6a to 6c are idle and the projections 8a, 8c are sufficiently remote from the associated projections 8b to allow for convenient lateral shifting of the stacks at the upper sides of the platforms 3.

The provision of a common prime mover (152) for the stepping motor 52 and the cam 42 of the transmission 36 is normally desirable and advantageous because this allows for highly accurate and relatively simple synchronization of the operation of the motor with the operation of the transmission.

The mechanism including the discs 33a, 33b renders it possible to rapidly convert the apparatus for the transport of longer or shorter stacks. As mentioned above, this mechanism enables an operator to change the angular position of the shaft 26a relative to the shaft 24a, motor 52 and transmission 36 by the simple expedient of loosening the screws for the clamping discs 33a, 33b.

Conveyors in the form of toothed belts are preferred at this time because they require a minimum of maintenance.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for stepwise transport of at least one file of discrete commodities in a predetermined direction and along a predetermined path, particularly for transporting stacks of paper sheets or the like, comprising at least one transporting unit including more than two endless parallel conveyors each having at least one projection arranged to extend into and from said path in response to movement of the respective conveyor in said direction, said conveyors including a first group having at least one conveyor whose projection is located ahead of and a second group having at least one conveyor whose projection is located behind a commodity in said path, said unit further including discrete first and second rotary elements for each of said conveyors and each of said conveyors being trained over the respective rotary elements; and common drive means for said conveyors including a first shaft arranged to drive via first drive transmitting means one rotary element for each conveyor of said first group, a second shaft arranged to drive via second drive transmitting means one rotary element for each conveyor of said second group, stepping motor means arranged to intermittently rotate said shafts, and transmission means interposed between said motor means and said shafts, said transmission means including means for intermittently changing the angular position of one of said shafts with reference to the other of said shafts to thereby change the spacing between the projection of each conveyor in one of said groups and the projection of each conveyor in the other of said groups so that the spacing is larger as said projections receive or discharge said commodities and the spacing is smaller during conveyance of said commodities between the reception or discharge zones at which the commodities are received by or discharged from between said projections.

2. The apparatus of claim 1, wherein one of said groups includes a pair of conveyors and the other of said groups includes a conveyor disposed between the conveyors of said pair.

3. The apparatus of claim 1, wherein said one shaft is arranged to drive one rotary element for each conveyor of said second group.

4. The apparatus of claim 1, wherein said means for intermittently changing the angular position of said one shaft includes means for accelerating said one shaft with reference to said other shaft.

5. The apparatus of claim 1, wherein said means for intermittently changing the angular position of said one shaft includes means for decelerating said one shaft with reference to said other shaft.

6. The apparatus of claim 1, wherein said means for intermittently changing the angular position of said one shaft comprises means for alternatively accelerating and decelerating said one shaft with reference to said other shaft.

7. The apparatus of claim 1, wherein said transmission is operative to change the angular position of said one shaft with reference to said other shaft during the intervals of idleness of said motor means between successive rotations of said shafts.

8. The apparatus of claim 1, further comprising common prime mover means for said motor means and said transmission means.

9. The apparatus of claim 1, wherein said transmission means further comprises an endless flexible element trained over said shafts and having first and second reaches, said means for changing the angular position of said one shaft comprising first loop forming means engaging one of said reaches, second loop forming means engaging the other of said reaches, and means for simultaneously shifting said loop forming means with reference to said flexible element so that the dimensions of the loop which is formed in the one reach by said first loop forming means increase proportionally with attendant reduction of the dimensions of the loop which is formed in the other reach by said second loop forming means or vice versa and said one shaft is rotated by said flexible element relative to said other shaft when the dimensions of said loops change.

10. The apparatus of claim 9, wherein said flexible element is a toothed belt and said shafts comprise pulleys for said belt.

11. The apparatus of claim 9, wherein said loop forming means include dancer rolls and said shifting means includes common holder means for said rolls.

12. The apparatus of claim 9, further comprising first and second guide members flanking one of said loop forming means, said flexible element being trained over said guide members.

13. The apparatus of claim 12, wherein said guide members are rotatable about fixed axes.

14. The apparatus of claim 9, wherein said shifting means comprises a pivotable lever and cam-and-follower means for pivoting said lever back and forth.

15. The apparatus of claim 1, wherein said drive means further comprises means for transmitting torque from said motor means to said other shaft, said means for intermittently changing the angular position of said one shaft comprising means for rotating said one shaft in response to rotation of said other shaft.

16. The apparatus of claim 1, wherein said transmission means includes means for changing the angular position of said other shaft with reference to said one shaft.

17. The apparatus of claim 1, further comprising means for changing the angular position of one of said shafts with reference to said motor means and said transmission means.

18. The apparatus of claim 1, wherein said conveyors include toothed belts.

19. The apparatus of claim 18, wherein said projections are lobes which are secured to the respective belts.

* * * * *